(12) United States Patent
Bessho et al.

(10) Patent No.: US 9,294,031 B2
(45) Date of Patent: Mar. 22, 2016

(54) PINCH DETECTION APPARATUS FOR OPENING-AND-CLOSING MEMBER, AND OPENING-AND-CLOSING MEMBER APPARATUS

(71) Applicant: AISIN SEIKI KABUSHIKI KAISHA, Kariya-shi (JP)

(72) Inventors: Nobuyasu Bessho, Toyota (JP); Toshiro Maeda, Anjo (JP); Daisuke Yuasa, Toyoake (JP)

(73) Assignee: AISIN SEIKI KABUSHIKI KAISHA, Kariya-shi, Aichi-Ken (JP)

( * ) Notice: Subject to any disclaimer, the term of this patent is extended or adjusted under 35 U.S.C. 154(b) by 130 days.

(21) Appl. No.: 14/151,186

(22) Filed: Jan. 9, 2014

(65) Prior Publication Data

US 2014/0239867 A1    Aug. 28, 2014

(30) Foreign Application Priority Data

Feb. 28, 2013    (JP) ................ 2013-038551

(51) Int. Cl.

| | |
|---|---|
| *H02H 7/08* | (2006.01) |
| *H02P 29/02* | (2006.01) |
| *H02H 7/085* | (2006.01) |
| *H02P 25/06* | (2006.01) |
| *E05F 15/40* | (2015.01) |
| *E05F 15/41* | (2015.01) |

(52) U.S. Cl.
CPC .............. *H02P 29/022* (2013.01); *E05F 15/40* (2015.01); *E05F 15/41* (2015.01); *H02H 7/0851* (2013.01);
(Continued)

(58) Field of Classification Search
CPC .................................................. H02H 7/0851

USPC ......... 318/466, 467, 468, 469, 471, 476, 434, 318/432; 323/274, 284; 361/1, 24, 25, 37, 361/158; 236/67–104
See application file for complete search history.

(56) References Cited

U.S. PATENT DOCUMENTS

| | | | |
|---|---|---|---|
| 5,250,882 A | 10/1993 | Odoi et al. | |
| 5,488,276 A | * 1/1996 | Nishibe | ............. 318/473 |

(Continued)

FOREIGN PATENT DOCUMENTS

| | | |
|---|---|---|
| JP | 2004-232280 A | 8/2004 |
| JP | 3931732 B2 | 3/2007 |
| JP | 2010-110171 A | 5/2010 |

OTHER PUBLICATIONS

The Extended European Search Report issued on Jun. 5, 2014, by the European Patent Office in corresponding European Patent Application No. 13194777.2-1806. (6 pages).

*Primary Examiner* — Rita Leykin
(74) *Attorney, Agent, or Firm* — Buchanan Ingersoll & Rooney PC (57) ABSTRACT

A pinch detection apparatus for an opening-and-closing member actuated by a motor, the pinch detection apparatus includes a reference data storage portion calculating load data on the basis of a rotation speed of the motor and an environmental temperature, the reference data storage portion storing the load data and the environmental temperature as reference load data and reference temperature data, respectively, a drive load calculation portion calculating drive load data, and a pinch determination portion configured to determine an occurrence of pinch on the basis of a comparison result obtained by comparing a difference between the reference load data and the drive load data with a threshold, the pinch determination portion configured to correct a relative relation between the difference between the reference load data and the drive load data, and the threshold on the basis of a relative relation between a reference temperature and a drive temperature.

12 Claims, 8 Drawing Sheets

(52) U.S. Cl.
CPC ........... *H02H 7/0852* (2013.01); *H02H 7/0858*
(2013.01); *H02P 25/06* (2013.01); *E05Y*
*2800/414* (2013.01); *E05Y 2900/50* (2013.01)

(56) References Cited

U.S. PATENT DOCUMENTS

| | | | |
|---|---|---|---|
| 5,585,702 A * | 12/1996 | Jackson et al. | 318/266 |
| 5,616,997 A * | 4/1997 | Jackson et al. | 318/467 |
| 6,274,947 B1 * | 8/2001 | Terashima | 307/10.1 |
| 6,870,334 B2 * | 3/2005 | Jurado et al. | 318/282 |
| 6,906,487 B2 * | 6/2005 | de Frutos | 318/468 |
| 6,946,811 B2 | 9/2005 | Kikuta et al. | |
| 7,342,373 B2 * | 3/2008 | Newman et al. | 318/466 |
| 7,518,325 B2 * | 4/2009 | Odland et al. | 318/280 |
| 7,679,301 B2 * | 3/2010 | Gregori et al. | 318/282 |
| 8,562,034 B2 | 10/2013 | Hirota et al. | |
| 2004/0124801 A1 | 7/2004 | Jurado et al. | |

* cited by examiner

PINCH DETECTION APPARATUS FOR OPENING-AND-CLOSING MEMBER, AND OPENING-AND-CLOSING MEMBER APPARATUS

CROSS REFERENCE TO RELATED APPLICATIONS

This application is based on and claims priority under 35 U.S.C. §119 to Japanese Patent Application 2013-038551, filed on Feb. 28, 2013, the entire content of which is incorporated herein by reference.

TECHNICAL FIELD

This disclosure relates to a pinch detection apparatus for an opening-and-closing member, and an opening-and-closing member apparatus which uses the pinch detection apparatus.

BACKGROUND DISCUSSION

A known opening-and-closing member may be provided with an apparatus which is for detecting pinch or entrapment of, for example, an object during an automatic closing operation of the opening-and-closing member. For example, JP3931732B (hereinafter referred to as Patent reference 1) discloses a known pinch detection apparatus provided at a sunroof of a vehicle. According to the known pinch detection apparatus disclosed in Patent reference 1, first, reference load data is calculated from a fluctuating rotation speed of a motor during a closing operation in a case where a predetermined condition is established, and is stored. At the closing operation after the storage of the reference load data, a difference between drive data calculated from the fluctuating rotation speed and the reference load data is calculated. On the basis of comparison between the difference and a threshold, that is, on the basis of a comparison result, pinch detection is performed. Conversion from data of the fluctuating rotation speed to data of load fluctuation is performed on the basis of a known function that is related to a rotation speed of a motor and a generated torque.

In addition, JP2010-110171A (hereinafter referred to as Patent reference 2) discloses a known motor control apparatus performing a pinch detection at, for example, a window of a vehicle. According to the known motor control apparatus disclosed in Patent reference 2, a relationship among a motor temperature and motor characteristics, and an estimated load is mapped. At a closing operation of an opening-and-closing member, presence or absence of the pinch is determined on the basis of the estimated load derived from the motor temperature and the motor characteristics according to the map. More specifically, the map, which indicates the motor characteristics for a classification of motor temperature ranges (−30° C.~0° C., 0° C.~40° C., 40° C.~80° C.), plural driving voltages (8V, 12V, 16V) and motor rotation speeds, is preset. From the motor temperature, the driving voltage and the motor rotation speed which are detected, a processing for estimating the load is performed, referring to the map. Here, the motor temperature is detected by a temperature sensor provided in a vicinity of the motor and the above-explained load estimation is performed on the basis of the detected temperature.

According to the apparatus of the Patent reference 1, however, it is not considered that a relationship between the rotation speed and the load of the motor fluctuates depending on an environmental temperature. As will be stated below in detail, the relationship between the rotation speed of the motor and the load of the motor substantially shows to a negative linear function, however, an inclination of the function changes depending on the environmental temperature. Thus, in a case where the environmental temperature at the time of calculating the reference load data and the environmental temperature at the time of calculating the drive data differ from each other, the actual difference between the reference load data and the drive data, and the calculated difference between the reference load data and the drive data do not coincide with each other. Consequently, according to the apparatus of the Patent reference 1, the relationship between the difference between the reference load data and the drive data, and the detection threshold changes depending on the temperature, and therefore it is difficult for pinch detection with high accuracy to be performed.

As a first problem of the apparatus of the Patent reference 2, the temperature sensor that accurately detects the temperature of the motor is needed because the map, which indicates the relationship between an absolute temperature (temperature range) of the motor and the motor characteristics, is used. Thus, the temperature sensor with high accuracy needs to be provided in a vicinity of the motor, which increases an introduction cost. Secondly, the load estimation performed by using the initial characteristic map does not necessarily remain useful or usable thereafter because the relationship between the motor temperature and the motor characteristics changes due to, for example, an aging deterioration of the motor. Therefore, the initial detection accuracy may not be maintained after the apparatus is used for many years.

A need thus exists for a pinch detection apparatus for an opening-and-closing member and an opening-and-closing member apparatus, which are not susceptible to the drawback mentioned above.

SUMMARY

According to an aspect of this disclosure, a pinch detection apparatus for an opening-and-closing member actuated by a motor, includes a reference data storage portion calculating load data on the basis of a rotation speed of the motor and an environmental temperature which are obtained in a case where a closing operation of the opening-and-closing member is performed at a predetermined time, the reference data storage portion storing the load data and the environmental temperature as reference load data and reference temperature data, respectively, a drive load calculation portion calculating drive load data on the basis of the rotation speed of the motor and the environmental temperature which are obtained in a case where the closing operation of the opening-and-closing member is performed after the reference load data is stored, and a pinch determination portion configured to determine an occurrence of pinch on the basis of a comparison result obtained by comparing a difference between the reference load data and the drive load data with a threshold set in order to determine the pinch at the opening-and-closing member, the pinch determination portion configured to correct a relative relation between the difference between the reference load data and the drive load data, and the threshold on the basis of a relative relation between a reference temperature which corresponds to the reference temperature data and a drive temperature which corresponds to the environmental temperature obtained at the closing operation of the opening-and-closing member after the reference load data is stored.

According to another aspect of this disclosure, an opening-and-closing member apparatus includes an opening-and-closing member, a motor, a rotation speed detection portion detecting a rotation speed of the motor and a pinch detection apparatus actuated by the motor. The pinch detection apparatus includes a reference data storage portion calculating load data on the basis of a rotation speed of the motor and an environmental temperature which are obtained in a case where a closing operation of the opening-and-closing member is performed at a predetermined time, the reference data storage portion storing the load data and the environmental temperature as reference load data and reference temperature data, respectively, a drive load calculation portion calculating drive load data on the basis of the rotation speed of the motor and the environmental temperature which are obtained in a case where the closing operation of the opening-and-closing member is performed after the reference load data is stored, and a pinch determination portion configured to determine an occurrence of pinch on the basis of a comparison result obtained by comparing a difference between the reference load data and the drive load data with a threshold set in order to determine the pinch at the opening-and-closing member, the pinch determination portion configured to correct a relative relation between the difference between the reference load data and the drive load data, and the threshold on the basis of a relative relation between a reference temperature which corresponds to the reference temperature data and a drive temperature which corresponds to the environmental temperature obtained at the closing operation of the opening-and-closing member after the reference load data is stored.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
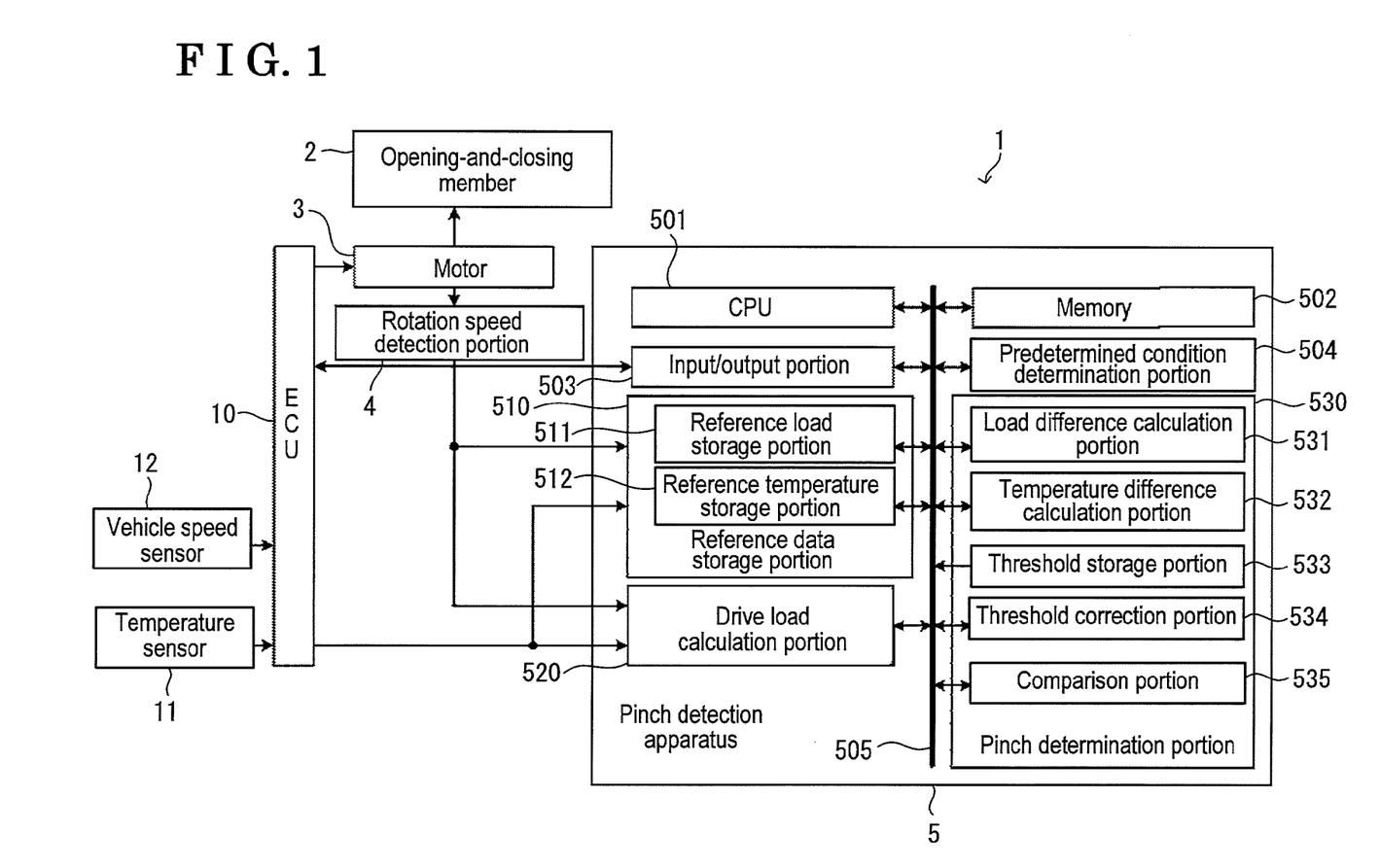
FIG. 1 is a block diagram of an opening-and-closing member apparatus provided with a pinch detection apparatus according to a first embodiment disclosed here.

A first embodiment disclosed here will be described. As illustrated in FIG. 1, an opening-and-closing member apparatus 1 includes an opening-and-closing member 2, a motor 3, a rotation speed detection portion 4 and a pinch detection apparatus 5. In this embodiment, the opening-and-closing member apparatus 1 is assumed to be an opening-and-closing member apparatus for a vehicle. In this embodiment, the opening-and-closing member 2 is assumed to be a sunroof, however, as will be clear from the explanation below, this disclosure may be applied to a configuration of a pinch detection at, for example, a slide door, a power window or other opening-and-closing member.

The motor 3 actuates the opening-and-closing member 2 to slide relative to a roof opening portion. The motor 3 rotates in a forward direction and a reverse direction in response to a closing signal and an opening signal from an ECU 10. An operation of the motor 3, which actuates the opening-and-closing member 2 to slide in a closing direction will be hereinafter referred to as a closing operation or an automatic closing operation. In addition, pinch or entrapment means that an object or a human body (or part thereof) is pinched or entrapped between the opening-and-closing member 2 and an end portion of the roof opening portion. The ECU 10 is appropriately supplied with electricity power.

The rotation speed detection portion 4 detects a rotation speed of the motor 3. The rotation speed of the motor 3 may be detected by a sensor (for example, a hall IC) which outputs a pulse that synchronizes with the rotation of the motor 3 or by a circuit which detects and forms current ripple at a driving signal of the motor 3.

An environmental temperature detected by a temperature sensor 11 is inputted to the ECU 10. In this embodiment, a temperature sensor that is generally mounted on a vehicle (for example, the sensor detecting temperature in order to indicate the temperature on an instrument panel) is used as the temperature sensor 11. A sensor which directly detects temperature of the motor 3 may be implemented as the temperature sensor 11.

The pinch detection apparatus 5 includes a CPU 501, a memory 502, an input/output portion 503, a predetermined condition determination portion 504, a reference data storage portion 510, a drive load calculation portion 520 and a pinch determination portion 530, all of which and internal components, which will be described below, are connected with one another by a bus 505. The CPU 501 is a processor which controls exchange of signals among the parts and the portions. The memory 502 is a memory which stores therein, for example, program. The input/output portion 503 functions as an input/output interface between the pinch detection apparatus 5 and the ECU 10.

The predetermined condition determination portion 504 determines whether or not a state, in which the opening-and-closing member 2 and the motor 3 are placed, fulfills or meets a predetermined condition. In this embodiment, the predetermined condition is established or met in a state where disturbance including vibrations, an accelerated velocity or the like is not occurring to the opening-and-closing member 2 and to the motor 3, that is, for example, in a state where the vehicle is stopped and a power supply of the ECU 10 is turned ON. In this case, the predetermined condition determination portion 504 obtains data of a vehicle speed (which is obtained from a vehicle speed sensor 12) and of power supply voltage from the ECU 10, and in a case where the vehicle speed is 0 and the power supply voltage is a predetermined value (for example, 12V), the predetermined condition determination portion 504 determines that the predetermined condition is established. In addition, the environmental temperature obtained by the temperature sensor 11 may be added to a condition that determines whether or not the predetermined condition is established. For example, it may be determined that the predetermined condition is not established in a case of an extremely low temperature (for example, −20° C. or lower) or an extremely high temperature (for example, 50° C. or higher).

Figure 2:
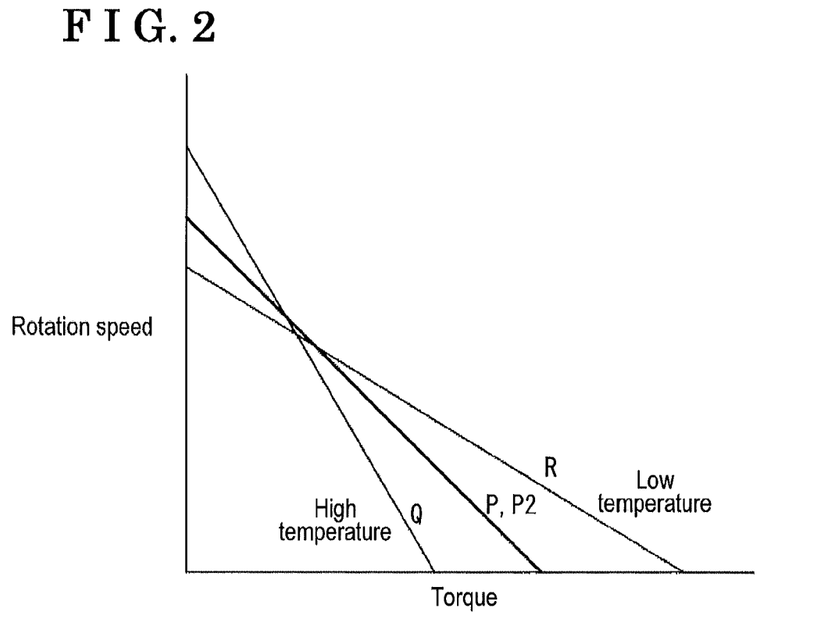
FIG. 2 is a diagram explaining a relationship among temperature, torque and a rotation speed of a motor.

The reference data storage portion 510 includes a reference load storage portion 511 and a reference temperature storage portion 512. At the closing operation which is performed in a case where the predetermined condition is established, the rotation speed detected by the rotation speed detection portion 4 and temperature data obtained from the temperature sensor 11 via the ECU 10 are inputted to the reference data storage portion 510. At the closing operation that is performed when the predetermined condition is established, the reference load storage portion 511 calculates, from the inputted rotation speed, reference load data indicating a load fluctuation which corresponds to a rotation speed fluctuation, and the reference load storage portion 511 stores the calculated reference load data. The reference load data is calculated and derived from a predetermined function of torque-rotation speed (hereinafter referred to as "a predetermined function") illustrated in FIG. 2. The reference load data will be described in detail later. The reference temperature storage portion 512 stores the inputted temperature data as reference temperature data.

To the drive load calculation portion 520, the rotation speed which is detected by the rotation speed detection portion 4 at the closing operation performed after the storing operation by the reference data storage portion 510, and the temperature data which is obtained from the temperature sensor 11 via the ECU 10 at the closing operation performed after the storing operation by the reference data storage portion 510, are inputted. From the inputted rotation speed, the drive load calculation portion 520 calculates drive load data indicating a load fluctuation which corresponds to a rotation speed fluctuation. Also the drive load data is calculated and derived from the predetermined function.

The pinch determination portion 530 includes a load difference calculation portion 531, a temperature difference calculation portion 532, a threshold storage portion 533, a threshold correction portion 534 and a comparison portion 535.

The load difference calculation portion 531 subtracts the reference load data, which is stored by the reference load storage portion 511, from the drive load data, which is calculated by the drive load calculation portion 520, and outputs a difference between the reference load data and the drive load data (hereinafter referred to as "a load difference"). The temperature difference calculation portion 532 subtracts the reference temperature data, which is stored by the reference temperature storage portion 512, from drive temperature data, which is obtained by the drive load calculation portion 520, and outputs a difference between the reference temperature data and the drive temperature data (hereinafter referred to as "a temperature difference"). In This embodiment, a relative relation between the reference temperature data and the drive temperature data is expressed by the difference therebetween, however, the relative relation between the reference temperature data and the drive temperature data may be defined by a ratio or by a certain function.

Figure 3:
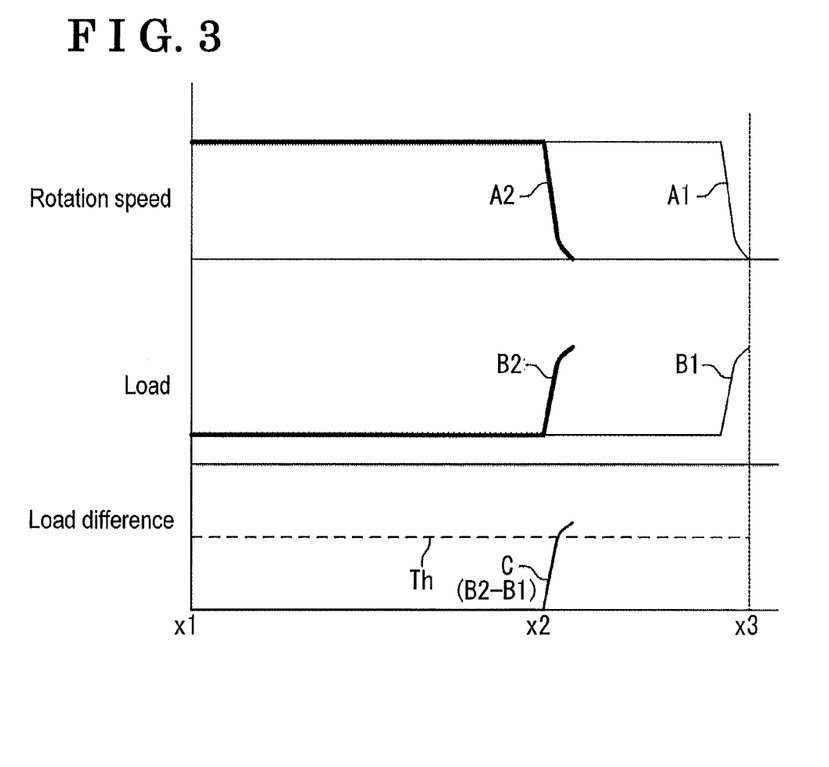
FIG. 3 is a diagram explaining a pinch detection according to the first embodiment.

The threshold storage portion 533 stores a reference threshold at a time when the predetermined condition is established. Here, the rotation speed fluctuation, the load fluctuation, the load difference and the threshold, from a closing operation start position x1 to a closing operation end position x3, are explained by using FIG. 3. A line A1 represents the rotation speed fluctuation in a case where the predetermined condition is established. A line B1 represents the load fluctuation which is converted from the line A1 by use of the predetermined function. A line A2 represents the rotation speed fluctuation when the pinch occurs in a vicinity of a position x2 under a condition similar to that when the predetermined condition is established. A line B2 represents the load fluctuation which is converted from the line A2 by use of the predetermined function. A line C corresponds to a difference value obtained by subtracting the line B1 from the line B2, that is, the line C corresponds to the load difference. A line Th represents the threshold. The comparison portion 535, which will be described later, determines the occurrence of the pinch when the line C crosses or goes beyond the line Th in a vicinity of the position x2.

The threshold correction portion 534 corrects the reference threshold on the basis of the temperature difference, and outputs a corrected threshold. As can be seen from FIG. 2, in a high-temperature state (corresponding to a function Q) where temperature is higher than a reference temperature (for example, corresponding to a function P), the load (torque) which is converted from a given detected rotation speed by use of the function P is higher than an actual load which is converted from the rotation speed identical to the given detected rotation speed by use of the function Q. Therefore, in a case where the drive temperature is higher than the reference temperature, the threshold Th needs to be corrected upwardly in order to compensate an error in the load. On the other hand, in a low-temperature state (corresponding to a function R) where temperature is lower than the reference temperature (for example, corresponding to the function P), the load which is converted from a given detected rotation speed by use of the function P is lower than an actual load which is converted from the rotation speed identical to the given detected rotation speed by use of the function R. Therefore, in a case where the drive temperature is lower than the reference temperature, the threshold Th needs to be corrected downwardly in order to compensate the error in the load.

Figure 4:
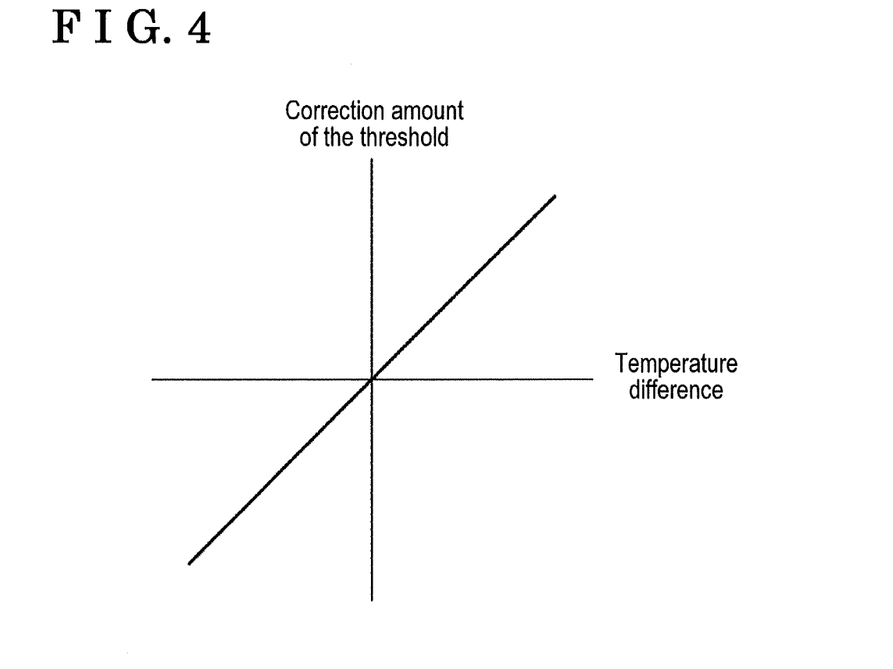
FIG. 4 is a diagram explaining a relationship between a temperature difference and a threshold correction amount according to the first embodiment.

FIG. 4 illustrates a threshold correction amount relative to the temperature difference, which is used for performing the above-described correction operation. The correction amount at the correction of the threshold is defined as a positive function relative to a change from the reference temperature to the drive temperature. Specifically, as illustrated in FIG. 4, the threshold correction amount is set so that the threshold correction amount monotonically increases relative to the temperature difference, and a case in which the temperature difference is zero corresponds to an origin of the positive function. In this embodiment, a relationship between the temperature difference and the threshold correction amount is expressed by a linear function, however, other function may be used for expressing the relationship. Alternatively, the relationship between the temperature difference and the threshold correction amount may be defined at a predetermined reference table.

However, for example, in a case where the reference temperature when the predetermined condition is established is 40° C. and the drive temperate is −20° C. (the temperature difference=−60° C.), the threshold correction amount is extremely large, and thus it is possible that pinch detection with high accuracy is not ensured. Thus, the threshold correction portion 534 may output a detection invalidation signal in a case where the temperature difference is not within a predetermined range (for example, ±50° C.). The CPU 501, upon receiving the detection invalidation signal, invalidates a detection processing, that is, a comparison processing, at the pinch determination portion 530, and outputs a stop signal to the ECU 10 and inhibits the automatic closing operation of the motor 3. In this case, the opening-and-closing member 2 is opened/closed by a manual operation of a user.

The comparison portion 535 determines presence or absence of the occurrence of the pinch by comparing the load difference with the corrected threshold. In a case where the load difference is equal to or less than the corrected threshold, the comparison portion 535 outputs a non-detection signal which indicates that there is no occurrence of the pinch or the comparison portion 535 outputs no signal. On the other hand, in a case where the load difference exceeds the corrected threshold, the comparison portion 535 outputs a detection signal which indicates that there is the occurrence of the pinch. In a case where the detection signal is inputted during the closing operation, the ECU 10 reverses the driving of the motor 3 so that the opening-and-closing member 2 is operated to open (an opening operation). In a case where the detection signal is inputted during the closing operation, the ECU 10 may stop the opening-and-closing member 2 from performing the closing operation so that a stopped state, that is, the state where the closing operation is stopped, is maintained.

Figure 5:
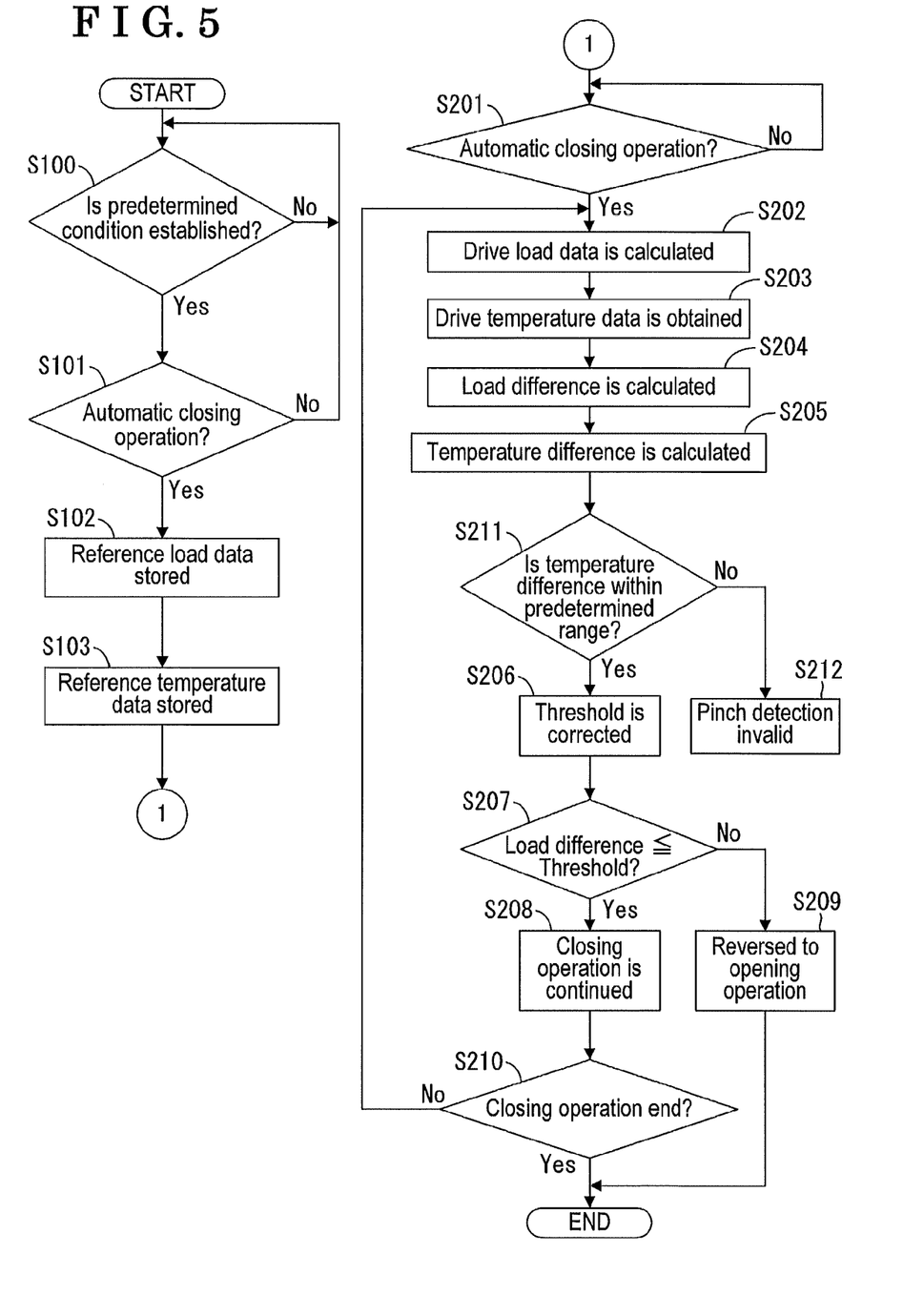
FIG. 5 is a flowchart of a pinch detection control according to the first embodiment.

As illustrated in FIG. 5, at Step S100, the predetermined condition determination portion 504 determines whether or not the predetermined condition is established. In a case where the predetermined condition is established (Yes at Step S100), the process moves to Step S101.

At Step S101, the CPU 501 determines whether or not the automatic closing operation of the opening-and-closing member 2 is started. The start of the automatic closing operation may be detected when the CPU 501 detects that the closing signal is outputted from the ECU 10 to the motor 3 or that the rotation speed is inputted from the rotation speed detection portion 4 to the reference load storage portion 511. In a case where the closing operation is started (Yes at Step S101), the process moves to Step S102.

At Step S102, the reference load storage portion 511 calculates, from the rotation speed detected by the rotation speed detection portion 4, the reference load data which indicates the load fluctuation that corresponds to the rotation speed fluctuation, and stores the calculated reference load data. In addition, at Step S103, the reference temperature storage portion 512 stores the temperature, which is obtained by the temperature sensor 11 via the ECU 10, as the reference temperature data. Thus, the operation of the reference data storage portion 510 ends.

After that, at Step S201, the CPU 501 determines whether or not the automatic closing operation of the opening-and-closing member 2 is started, in a similar manner to Step S101. In a case where the closing operation is started (Yes at Step S201), the process moves to Step S202.

At Step S202, the drive load calculation portion 520 obtains the rotation speed from the rotation speed detection portion 4 and calculates the drive load data indicating the load fluctuation. In addition, at Step S203, the drive load calculation portion 520 obtains the temperature data (the drive temperature data) from the ECU 10.

At Step S204, the load difference calculation portion 531 subtracts the reference load data stored at Step S102 from the drive load data calculated at Step S202, and accordingly calculates the load difference.

At Step S205, the temperature difference calculation portion 532 subtracts the reference temperature data stored at Step S103 from the drive temperature data calculated at Step S203, and accordingly calculates the temperature difference.

Between Step S205 and Step S206 which will be described later, Step S211 which determines a feasibility of the pinch detection may be provided. That is, at Step S211, it is determined whether or not the pinch detection may be conducted. At Step S211, the threshold correction portion 534 determines whether or not the temperature difference is within the predetermined range. In a case where the temperature difference is not within the predetermined range (No at Step S211), the threshold correction portion 534 outputs the detection invalidation signal, and the CPU 501 upon receiving the detection invalidation signal invalidates the pinch detection processing of the pinch determination portion 530 and causes the ECU 10 to inhibit the automatic closing operation of the opening-and-closing member 2 at Step S212. In a case where the temperature difference is within the predetermined range (Yes at Step S211), the process moves to Step S206.

At Step S206, the threshold correction portion 534 corrects the reference threshold on the basis of the temperature difference, and outputs the corrected threshold. In a case where the temperature difference is zero, the threshold correction portion 534 does not correct the reference threshold. However, also in this case, the output from the threshold correction portion 534 is referred to as the corrected threshold, for convenience of explanation.

At Step S207, the comparison portion 535 compares the load difference with the corrected threshold and determines presence or absence of the occurrence of the pinch. In a case where the load difference is equal to or less than the corrected threshold (Yes at Step S207), the driving of the motor 3 (that is, the closing operation) is continued at Step S208. In a case where the load difference exceeds the corrected threshold (No at Step S207), the comparison portion 535 outputs the detection signal, and the CPU 501 causes the ECU 10 to reverse the driving of the motor 3 at Step S209. Thus, the closing operation of the opening-and-closing member 2 is reversed to the opening operation.

At Step S210, the CPU 501 determines whether or not the closing operation of the opening-and-closing member 2 is completed. In a case where the closing operation is not completed (No at Step S210), Step S202 to Step S208 are continued, that is, repeated, until the closing operation ends. In a case where the closing operation ends (Yes at Step S210), the process ends. Under assumption that the temperature is substantially constant during one closing operation, the obtainment of the drive temperature data at Step S203, the calculation of the temperature difference at Step S205 and the determination on the feasibility of the pinch detection at Step S211 may be omitted in the second execution of the flow and thereafter. In this case, the temperature difference that is initially calculated at Step S205 is maintained.

As described above, according to this embodiment, the detection threshold is corrected on the basis of the temperature difference. Therefore, even in a case where the temperature difference exists between when the predetermined condition is established and when the closing operation is performed after the establishment of the predetermined condition, the motor load, which is dependent on the temperature, is determined accurately and as a result the pinch detection with high accuracy is realized. In addition, in the aforementioned embodiment, the threshold is corrected on the basis of a relative temperature (the temperature difference) at a time when each of the load is obtained but not on the basis of an absolute temperature, and therefore there is no need for a direct measurement or an accurate measurement of the motor temperature (including temperature in a vicinity of the motor). Consequently, the temperature sensor that is ordinarily provided at the vehicle may be used for the temperature measurement of this embodiment, and therefore the pinch detection apparatus which is readily introduced at low costs is achieved.

In addition, in the aforementioned embodiment, the reference load data and the reference temperature data may be updated at predetermined timing. For example, the CPU 501 may output a reference data update signal each time a predetermined period of time (for example, half a year, one year) elapses, and the ECU 10 upon receiving the reference data update signal may prompt the user to update the reference load data and the reference temperature data. In addition, the ECU 10 may recognize seasons (for example, a summer season, a winter season, a rainy season and the like) from the temperature or humidity which are detected by the temperature sensor 11 or a humidity sensor, and may prompt the user each time the season changes to update each of the reference data. Alternatively, the user may update each of the reference data at a desired timing.

Figure 6:
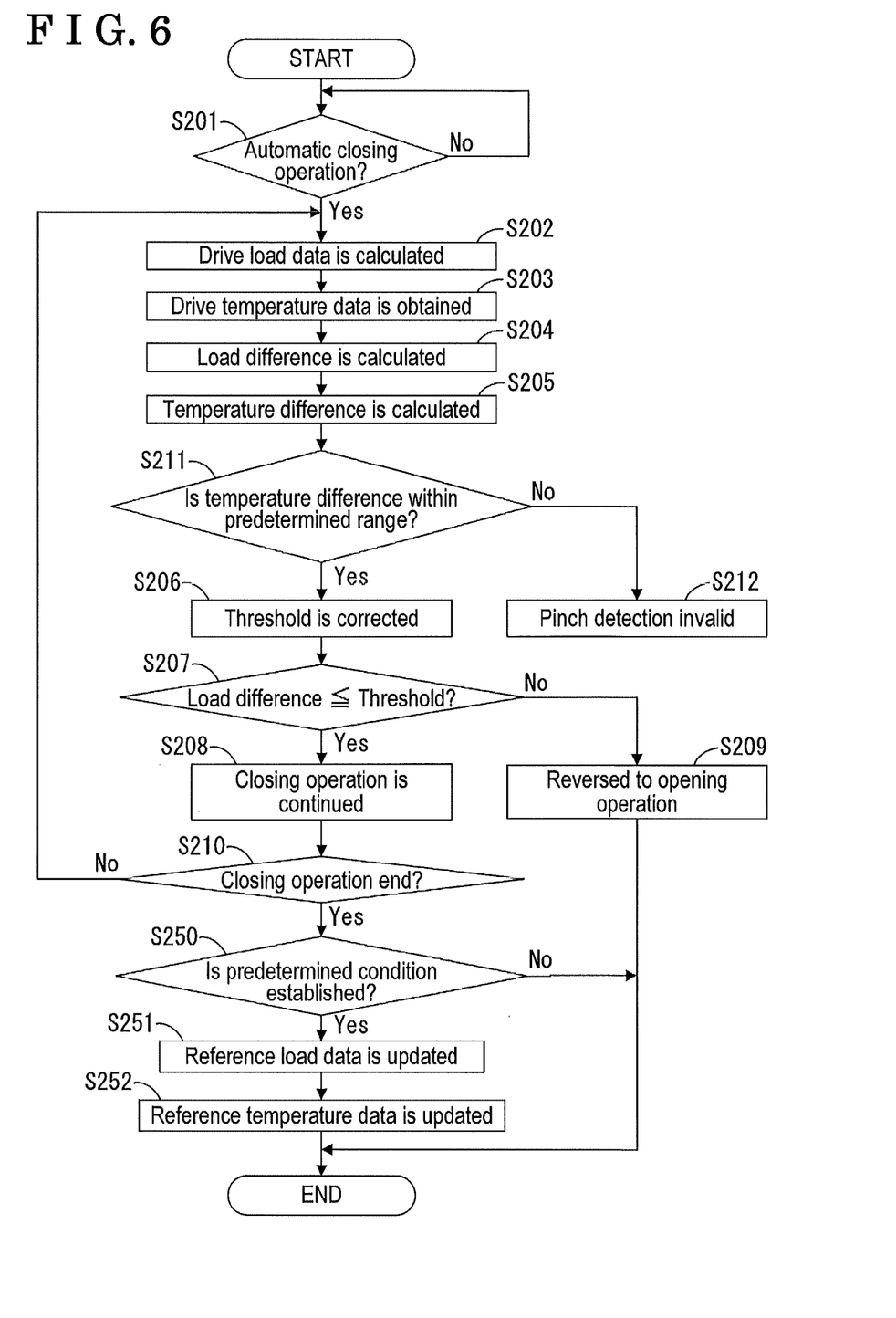
FIG. 6 is a flowchart of a pinch detection control according to a variation of the first embodiment.

Further, each of the reference data may be updated automatically at the closing operation, for example, at every closing operation. FIG. 6 illustrates a flowchart of a variation of this embodiment, where a processing of an automatic update of each of the reference data is additionally included. In the processing of the automatic update, when the pinch does not occur during the automatic closing operation that is performed in a state where the predetermined condition is established, the data of the load fluctuation obtained in this closing operation is rewritten or is renewed as new reference load data.

In FIG. 6, it is assumed that the storing process (Steps S100 to S103) for initially storing the reference load data and the reference temperature data is already performed. In the flowchart of FIG. 6, the identical numerical designations are given to the steps that are identical to the steps in the flowchart shown in FIG. 5 and the explanations thereof are omitted.

At Step S250, which immediately follows Step S210, the predetermined condition determination portion 504 determines whether or not the predetermined condition is established, in a similar manner to Step S100. In a case where the predetermined condition is established (Yes at Step S250), the process moves to Step S251. In a case where the predetermined condition is not established (No at Step S250), the process ends, and the reference load data and the reference temperature data which are stored at Step S102 are maintained.

At Step S251, the reference load storage portion 511 stores the drive load data, which is calculated at Step S202, as a new reference load data. In addition, at Step S252, the reference temperature storage portion 512 stores the drive temperature data, which is obtained at Step S203, as a new reference temperature data. Thus, the drive load data and the drive temperature data which are calculated at the closing operation are rewritten and updated as the new reference load data and the new reference temperature data, respectively.

The reference load data before being updated and the newly calculated reference load data may be averaged, and the average data may be updated as the new reference load data. Further, a moving average of plural reference load data, which are calculated over plural occasions when the predetermined condition is established, may be updated as the new reference load data.

As described above, according to the configuration where the reference load data and the reference temperature data are updated, each of the reference data is appropriately updated as the apparatus is used, and therefore ability or capability for performing the pinch detection with high accuracy is maintained regardless of an aging deterioration of the apparatus and/or a change in a use condition of the apparatus. In addition, the automatic update configuration illustrated in the flowchart of FIG. 6 updates each of the reference data without imposing burden on the user, thereby enhancing convenience.

Figure 7:
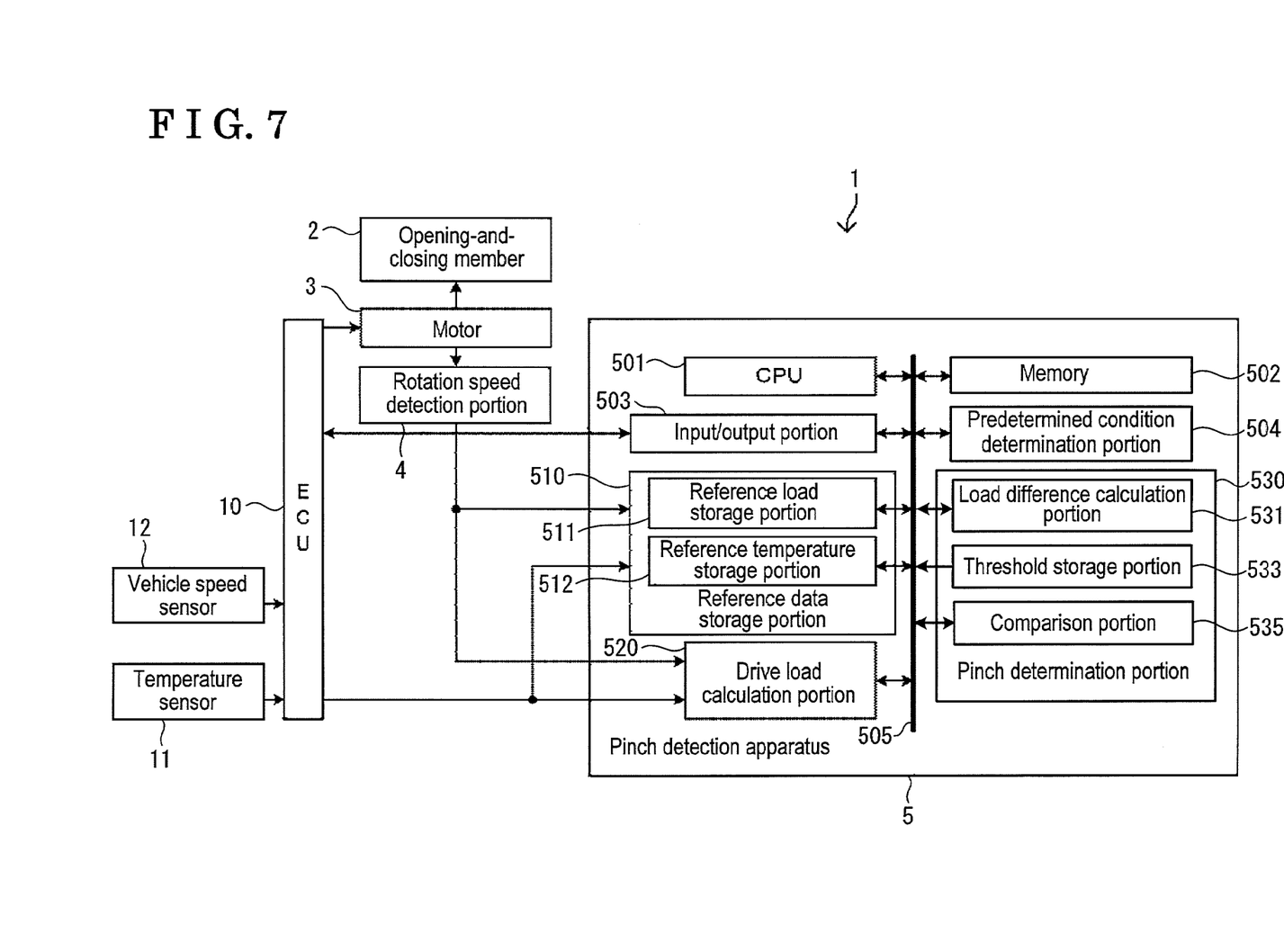
FIG. 7 is a block diagram of an opening-and-closing member apparatus provided with a pinch detection apparatus according to a second embodiment disclosed here.

A second embodiment disclosed here will be described. According to the configuration of the aforementioned first embodiment, the detection threshold is corrected on the basis of the relative relation between the reference temperature data and the drive temperature data. In the second embodiment, a configuration is shown where the drive load data is corrected on the basis of the relative relation between the reference temperature data and the drive temperature data. FIG. 7 is a block diagram of the opening-and-closing member apparatus which is provided with a pinch detection apparatus according to the second embodiment disclosed here. In this embodiment, the configurations other than the pinch detection apparatus 5 are identical to those of the first embodiment, and thus explanations of the identical configurations will be omitted.

The pinch detection apparatus 5 includes the CPU 501, the memory 502, the input/output portion 503, the predetermined condition determination portion 504, the reference data storage portion 510, the drive load calculation portion 520 and the pinch determination portion 530, all of which and the internal components, which will be described below, are connected with one another by the bus 505. The CPU 501, the memory 502, the input/output portion 503 and the predetermined condition determination portion 504 are identical to those of the first embodiment, and thus the explanations thereof will be omitted.

The reference data storage portion 510 includes the reference load storage portion 511 and the reference temperature storage portion 512. At the closing operation which is performed in a case where the predetermined condition is established, the rotation speed detected by the rotation speed detection portion 4 and the temperature data obtained from the temperature sensor 11 via the ECU 10 are inputted to the reference data storage portion 510. At the closing operation which is performed in a case where the predetermined condition is established, the reference load storage portion 511 calculates the reference load data on the basis of the inputted rotation speed and the inputted temperature, and stores the calculated reference load data. The reference load data is calculated and derived from a function (hereinafter referred to as "a function P2") which corresponds to the obtained temperature, from among the functions of torque-rotation speed illustrated in FIG. 2. The reference temperature storage portion 512 stores the temperature, which is obtained from the temperature sensor 11 via the ECU 10 in a case where the predetermined condition is established, as the reference temperature data.

To the drive load calculation portion 520, the rotation speed which is detected by the rotation speed detection portion 4 at the closing operation performed after the storing operation by the reference data storage portion 510, and the temperature data which is obtained from the temperature sensor 11 via the ECU 10 at the closing operation performed after the storing operation by the reference data storage portion 510, are inputted. From the inputted rotation speed, the drive load calculation portion 520 calculates the drive load data indicating the load fluctuation which corresponds to the rotation speed fluctuation. At the calculation of the drive load data, first, tentative drive load data is calculated on the basis of the obtained rotation speed and the function P2. Then, the tentative drive load data is corrected to be final drive load data on the basis of the relative relation (for example, the difference) between the inputted drive temperature and the reference temperature stored at the reference temperature storage portion 512.

For example, in a case where the drive temperature is higher than the temperature that is obtained when the predetermined condition is established, the torque in a low-rotation speed range is reduced, and therefore the tentative drive load data is corrected downwardly to calculate the final drive load data. On the contrary, in a case where the drive temperature is lower than the temperature that is obtained when the predetermined condition is established, the torque in the low-rotation speed range increases, and therefore the tentative drive load data is corrected upwardly to calculate the final drive load data. That is, the correction amount at the correction of the drive load data is defined as a negative function relative to the change from the reference temperature to the drive temperature. A relationship between the relative relation between the reference temperature and the drive temperature, and the correction amount of the drive load data may be expressed by, for example, a negative linear function, or may be defined at a predetermined reference table.

The pinch determination portion 530 includes the load difference calculation portion 531, the threshold storage portion 533 and the comparison portion 535. In a similar manner to the first embodiment, the load difference calculation portion 531 subtracts the reference load data, which is stored by the reference load storage portion 511, from the drive load data, which is calculated by the drive load calculation portion 520, and thus outputs the load difference.

The threshold storage portion 533 stores the threshold. The threshold is determined in a similar manner to the reference threshold in the first embodiment. In the second embodiment, the threshold is not corrected because the drive load data is calculated according to the relative relation between the reference temperature date and the drive temperature data.

The comparison portion 535 determines presence or absence of the occurrence of the pinch by comparing the load difference with the threshold. In a case where the load difference is equal to or less than the threshold, the comparison portion 535 outputs the non-detection signal which indicates that there is no occurrence of the pinch or the comparison portion 535 outputs no signal. On the other hand, in a case where the load difference exceeds the threshold, the comparison portion 535 outputs the detection signal which indicates the occurrence of the pinch. In a case where the detection signal is inputted during the closing operation, the ECU 10 reverses the driving of the motor 3 so that the opening-and-closing member 2 is operated to open. In a case where the detection signal is inputted during the closing operation, the ECU 10 may stop the opening-and-closing member 2 from performing the closing operation so that the stopped state is maintained.

Figure 8:
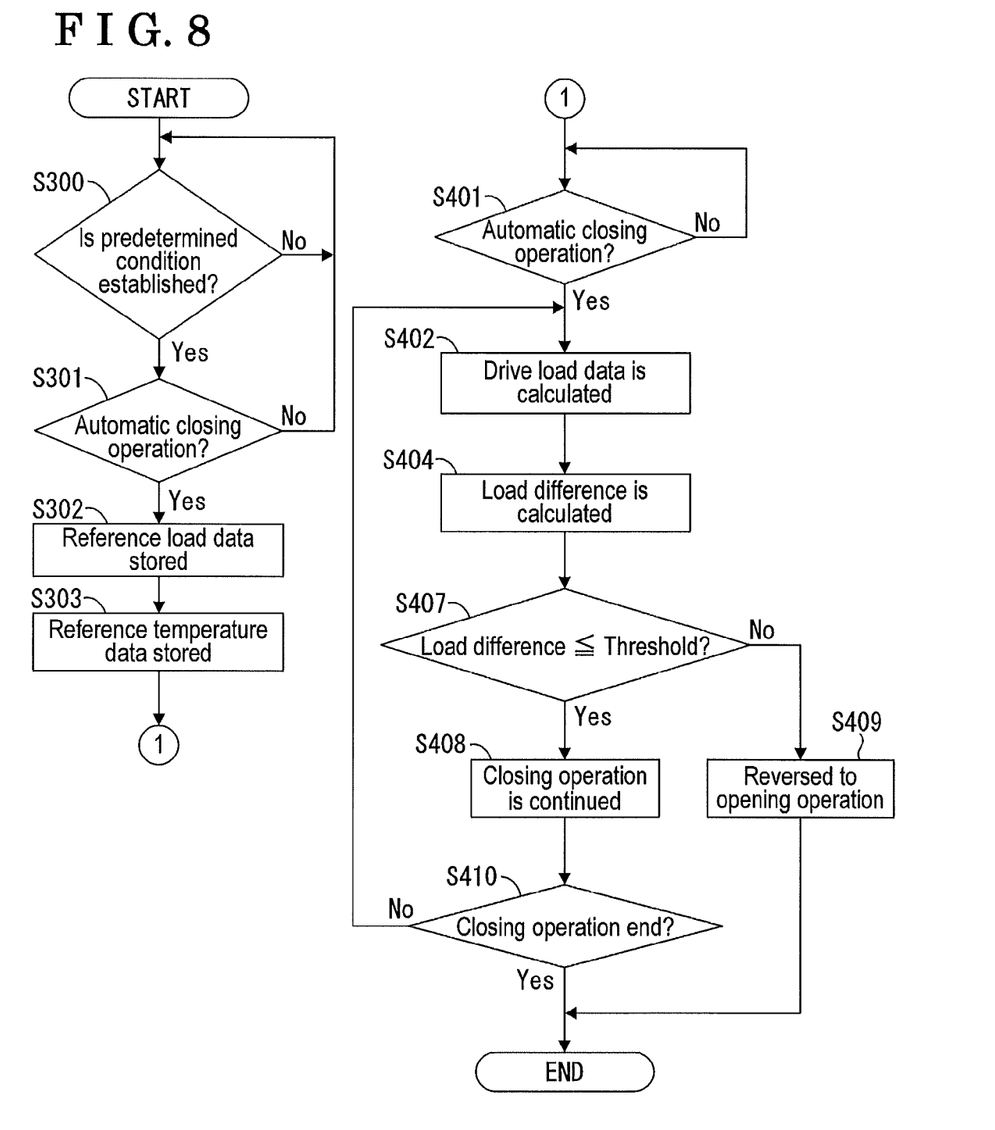
FIG. 8 is a flowchart of a pinch detection control according to the second embodiment.

As illustrated in FIG. 8, at Step S300, the predetermined condition determination portion 504 determines whether or not the predetermined condition is established. In a case where the predetermined condition is established (Yes at Step S300), the process moves to Step S301.

At Step S301, in a similar manner to that at Step S101 of the first embodiment, the CPU 501 determines whether or not the automatic closing operation of the opening-and-closing member 2 is started. In a case where the closing operation is started (Yes at Step S301), the process moves to Step S302.

At Step S302, the reference load storage portion 511 calculates, from the rotation speed detected by the rotation speed detection portion 4 and the temperature obtained by the ECU 10, the reference load data which indicates the load fluctuation that corresponds to the rotation speed fluctuation, in accordance with the function P2, then the reference load storage portion 511 stores the calculated reference load data. In addition, at Step S303, the reference temperature storage portion 512 stores the temperature, which is obtained by the temperature sensor 11 via the ECU 10, as the reference temperature data. Thus, the operation of the reference data storage portion 510 ends.

After that, at Step S401 the CPU 501 determines whether or not the automatic closing operation of the opening-and-closing member 2 is started, in a similar manner to Step S301. In a case where the closing operation is started (Yes at Step S401), the process moves to Step S402.

At Step S402, the drive load calculation portion 520 calculates, from the rotation speed obtained by the rotation speed detection portion 4, the tentative drive load data in accordance with the function P2. Then, the drive load calculation portion 520 calculates the final drive load data on the basis of the relative relation between the drive temperature data, which is obtained from the ECU 10, and the reference temperature data, which is stored at Step S303.

At Step S404, the load difference calculation portion 531 subtracts the reference load data stored at Step S302 from the drive load data calculated at Step S402, and accordingly calculates the load difference.

At Step S407, the comparison portion 535 compares the load difference with the threshold and determines presence or absence of the occurrence of the pinch. In a case where the load difference is equal to or less than the threshold (Yes at Step S407), the driving of the motor 3 is continued at Step S408 (that is, the closing operation is continued). In a case where the load difference exceeds the threshold (No at Step S407), the comparison portion 535 outputs the detection signal, and the CPU 501 causes the ECU 10 to reverse the driving of the motor 3 at Step S409. Thus, the closing operation of the opening-and-closing member 2 is reversed to the opening operation.

At Step S410, the CPU 501 determines whether or not the closing operation of the opening-and-closing member 2 is completed. In a case where the closing operation is not completed (No at Step S410), the process from Step S402 to Step S408 is continued, that is, repeated, until the closing operation ends. In a case where the closing operation ends (Yes at Step S410), the process ends. Under assumption that the temperature is substantially constant during one closing operation, the obtainment of the drive temperature data at Step S402 may be omitted in the second execution of the flow and thereafter. In this case, the temperature data that is initially obtained at Step S402 is maintained.

As described above, according to this embodiment, the load difference is calculated so as to reflect the relative relation between the temperature data, that is, the relative relation between the reference temperature data and the drive temperature data, at the time of the calculation of the load difference. Thus, even in a case where the temperature difference exists between when the predetermined condition is established and when the closing operation is performed after the establishment of the predetermined condition, the motor load, which is dependent on the temperature, is determined accurately. As a result, the pinch detection with high accuracy is realized. In addition, also in this embodiment, the load difference is calculated so as to reflect the relative temperature instead of the absolute temperature at the time of obtainment of each of the load, and therefore there is no need for the direct measurement or the accurate measurement of the motor temperature. Consequently, the temperature sensor that is ordinarily provided at the vehicle may be used for the temperature measurement of this embodiment, and therefore the pinch detection apparatus which is readily introduced at low costs is achieved.

Figure 9:
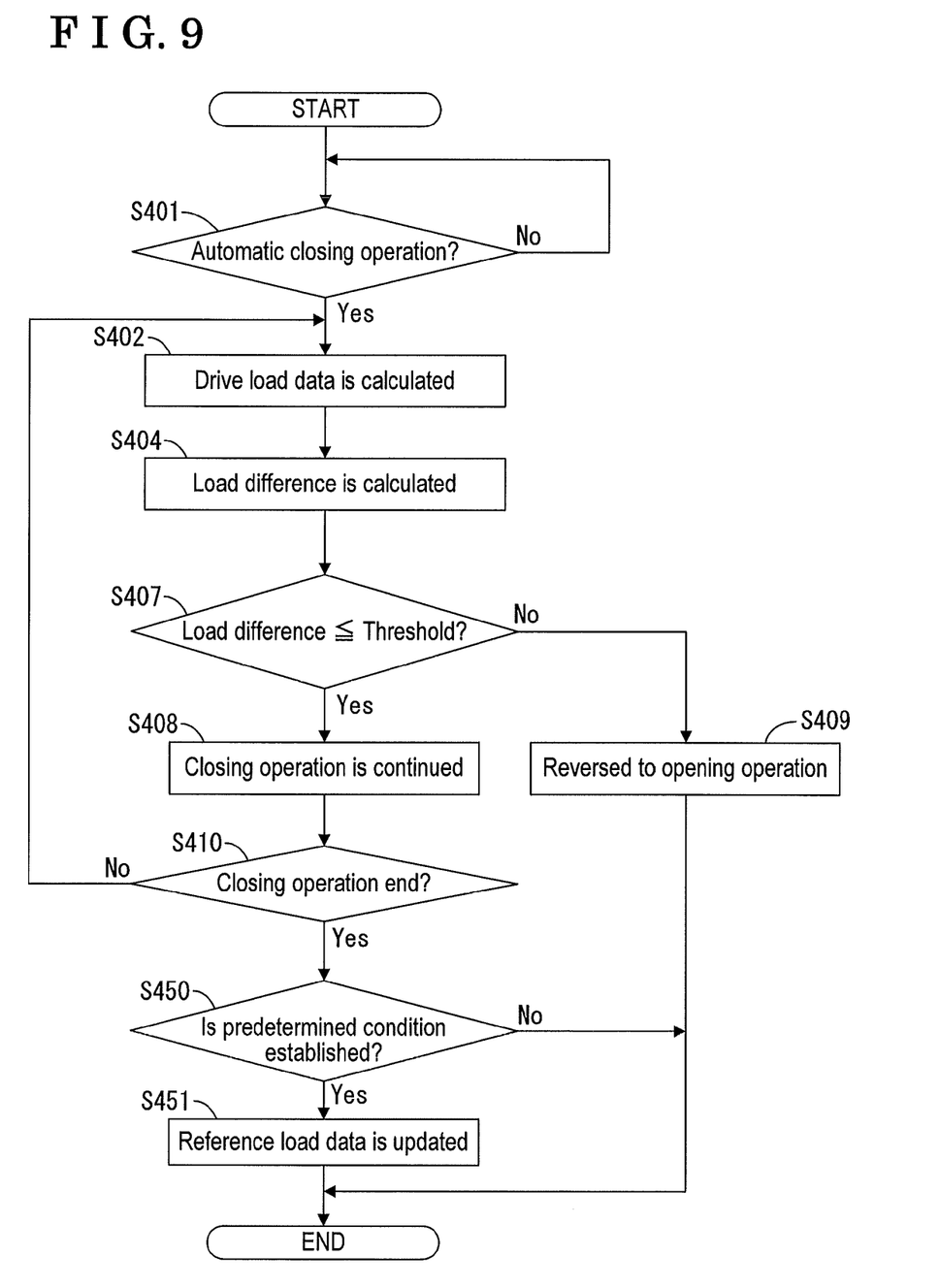
FIG. 9 is a flowchart of a pinch detection control according to a variation of the second embodiment.

In this embodiment, in a similar manner to the first embodiment, the reference load data may be updated by a manual operation of the user or may be updated automatically, at a predetermined timing. FIG. 9 illustrates a flowchart of a variation of this embodiment, where the processing of the automatic update of the reference load data is additionally included. In FIG. 9, it is assumed that the storing process (Steps S300 to S303) for initially storing the reference load data is already performed. In the flowchart of FIG. 9, the identical numerical designations are given to the steps that are identical to the steps in the flowchart shown in FIG. 8 and the explanations thereof are omitted.

At Step S450, which immediately follows Step S410, the predetermined condition determination portion 504 determines whether or not the predetermined condition is established, in a similar manner to Step S300. In a case where the predetermined condition is established (Yes at Step S450), the process moves to Step S451. In a case where the predetermined condition is not established (No at Step S450), the process ends and the reference load data stored at Step S302 is maintained.

At Step S451, the reference load storage portion 511 stores the drive load data, which is calculated at Step S402, as a new reference load data. Thus, the drive load data calculated at the closing operation is rewritten as the new reference load data, and is updated.

According to the above-described configuration, in a similar manner to the first embodiment, the reference load data is appropriately updated as the apparatus is used, and therefore the ability or capability for performing the pinch detection with high accuracy is maintained regardless of the aging deterioration of the apparatus and/or the change in the use condition of the apparatus. In addition, the automatic update configuration illustrated in the flowchart of FIG. 9 updates each of the reference data without imposing the burden on the user, thereby enhancing the convenience.

According to each of the aforementioned embodiments, the pinch detection apparatus 5 includes the reference data storage portion 510 which stores the reference load data and the reference temperature data which are related to the closing operation performed in a case where the predetermined condition is established, and the drive load calculation portion 520 which calculates the drive load data related to the closing operation after the storage of the reference load data and the reference temperature data. Further, the pinch detection apparatus 5 includes the pinch determination portion 530 which determines the occurrence of the pinch on the basis of a comparison result obtained by comparing the load difference between the reference load data and the drive load data with the threshold set in order to determine the pinch at the opening-and-closing member 2. At the pinch determination portion 530, the relative relation between the load difference and the threshold is corrected on the basis of the relative relation between the reference temperature and the drive temperature. Consequently, the pinch detection apparatus 5 at which the pinch detection with high accuracy is performed with the simple configuration, and the opening-and-closing member apparatus 1 at which the pinch detection apparatus 5 is used are realized. In addition, the reference data storage portion 510 is configured to update the reference load data at the predetermined timing. Consequently, the pinch detection with high accuracy is maintained over a long period of time even in a case where the aging deterioration occurs to characteristics of each of the portions or members.

The embodiments are described above, however, this disclosure is not limited thereto and various changes or modifications may be made. For example, the time of obtaining the reference load data and the reference temperature data does not need to be the time when the predetermined condition is established. The reference load data and the reference temperature data may be obtained when a condition, which is similar to or is comparable to a condition at the time of obtainment of the drive load data which is assumed, is established at the motor 3. In addition, according to the explanation in each of the aforementioned embodiments, the pinch detection apparatus of this disclosure and the opening-and-closing member apparatus of this disclosure are applied to the vehicle, however, application of this disclosure is not limited thereto. For example, the pinch detection apparatus and the opening-and-closing member apparatus which are disclosed here may be used for the pinch detection of any opening-and-closing member that is actuated by a motor to open/close, including but not limited to, an automatic opening-and-closing door, an automatic opening-and-closing shutter.

According to the aforementioned embodiment, the pinch detection apparatus 5 for the opening-and-closing member 2 actuated by the motor 3, the pinch detection apparatus 5 includes the reference data storage portion 510 calculating the load data on the basis of the rotation speed of the motor 3 and the environmental temperature which are obtained in a case where the closing operation of the opening-and-closing member 2 is performed at the predetermined time, the reference data storage portion 510 storing the load data and the environmental temperature as the reference load data and the reference temperature data, respectively, the drive load calculation portion 520 calculating the drive load data on the basis of the rotation speed of the motor 3 and the environmental temperature which are obtained in a case where the closing operation of the opening-and-closing member 2 is performed after the reference load data is stored, and the pinch determination portion 530 configured to determine the occurrence of the pinch on the basis of the comparison result obtained by comparing the difference between the reference load data and the drive load data with the threshold set in order to determine the pinch at the opening-and-closing member 2, the pinch determination portion 530 configured to correct the relative relation between the difference between the reference load data and the drive load data, and the threshold on the basis of the relative relation between the reference temperature which corresponds to the reference temperature data and the drive temperature which corresponds to the environmental temperature obtained at the closing operation of the opening-and-closing member 2 after the reference load data is stored.

According to the above described configuration, the relative relation between the difference between the reference load data and the drive load data, and the threshold is corrected on the basis of the relative relation between the reference temperature and the drive temperature. Thus, there is no need for a configuration where the temperature of the motor is accurately detected. Consequently, the pinch detection with high accuracy is achieved with a simple configuration.

According to the aforementioned embodiment, the predetermined time corresponds to the time when the predetermined condition is established at the motor 3.

According to the above described configuration, the reference load data is calculated and stored in a case where the predetermined condition is established. Consequently, the difference between the reference load data and the drive load data is calculated more accurately, and the pinch detection with high accuracy is performed.

According to the aforementioned embodiment, the pinch determination portion 530 is configured to correct the threshold on the basis of the relative relation between the reference temperature and the drive temperature.

According to the above described configuration, the processing includes the calculation of the relative relation between the reference temperature and the drive temperature, and the calculation of the correction amount of the threshold on the basis of the relative relation between the reference temperature and the drive temperature. Consequently, processing load of the correction processing is reduced.

According to the aforementioned embodiment, the correction amount at the correction of the threshold is defined as the positive function relative to the change from the reference temperature to the drive temperature.

According to the above described configuration, the correction processing is executed appropriately on the basis of a general relationship between the rotation speed and the load of the motor. Consequently, a versatility of the apparatus is ensured.

According to the aforementioned embodiment, the comparison processing at the pinch determination portion 530 is invalidated in a case where the difference between the reference temperature and the drive temperature is not within the predetermined range.

According to the above described configuration, the pinch detection is performed only in a case where the difference between the reference temperature and the drive temperature is within the predetermined range. Consequently, the accuracy of the pinch detection is ensured.

According to the aforementioned embodiment, the pinch determination portion 530 is configured to correct the drive load data on the basis of the relative relation between the reference temperature and the drive temperature.

According to the above described configuration, the processing includes the calculation of the relative relation between the reference temperature and the drive temperature, and the calculation of the correction amount of the threshold on the basis of the relative relation between the reference temperature and the drive temperature. Consequently, processing load of the correction processing is reduced.

According to the aforementioned embodiment, the correction amount at the correction of the drive load data is defined as the negative function relative to the change from the reference temperature to the drive temperature.

According to the above described configuration, the correction processing is executed appropriately on the basis of a general relationship between the rotation speed of the motor and the load of the motor 3. Consequently, the versatility of the apparatus is ensured.

According to the aforementioned embodiment, the reference data storage portion 510 is configured to update the reference load data at the predetermined timing.

According to the above described configuration, because the new reference load data is stored, the pinch detection with high accuracy is maintained over a long period of time even in a case where the relation among the environmental temperature, the rotation speed and the load is changed due to, for example, the aging deterioration of the motor 3.

According to the aforementioned embodiment, in a case where the closing operation of the opening-and-closing member 2, which is performed after the reference load data is stored, ends without detecting the occurrence of the pinch and in a case where the predetermined condition is established at the closing operation, the drive load data which is obtained at the closing operation is rewritten as the new reference load data.

According to the above described configuration, the reference load data is automatically updated at an appropriate timing, and consequently, convenience of the apparatus enhances.

According to the aforementioned embodiment, the opening-and-closing member apparatus 1 includes the opening-and-closing member 2, the motor 3, the rotation speed detection portion 4 detecting the rotation speed of the motor 3 and the pinch detection apparatus 5 actuated by the motor 3. The pinch detection apparatus 5 includes the reference data storage portion 510 calculating the load data on the basis of the rotation speed of the motor 3 and the environmental temperature which are obtained in a case where the closing operation of the opening-and-closing member 2 is performed at the predetermined time, the reference data storage portion 510 storing the load data and the environmental temperature as the reference load data and the reference temperature data, respectively, the drive load calculation portion 520 calculating the drive load data on the basis of the rotation speed of the motor 3 and the environmental temperature which are obtained in a case where the closing operation of the opening-and-closing member 2 is performed after the reference load data is stored, and the pinch determination portion 530 configured to determine the occurrence of the pinch on the basis of the comparison result obtained by comparing the difference between the reference load data and the drive load data with the threshold set in order to determine the pinch at the opening-and-closing member 2, the pinch determination portion 530 configured to correct the relative relation between the difference between the reference load data and the drive load data, and the threshold on the basis of the relative relation between the reference temperature which corresponds to the reference temperature data and the drive temperature which corresponds to the environmental temperature obtained at the closing operation of the opening-and-closing member 2 after the reference load data is stored.

According to the above described configuration, the opening-and-closing member apparatus, at which the pinch detection with high accuracy is performed with a simple configuration or at which the pinch detection with high accuracy is maintained even though, for example, the motor is deteriorated with time, is achieved.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A pinch detection apparatus for an opening-and-closing member actuated by a motor, the pinch detection apparatus comprising:

a reference data storage portion calculating load data on the basis of a rotation speed of the motor and an environmental temperature which are obtained in a case where a closing operation of the opening-and-closing member is performed at a predetermined time, the reference data storage portion storing the load data and the environmental temperature as reference load data and reference temperature data, respectively;

a drive load calculation portion calculating drive load data on the basis of the rotation speed of the motor and the environmental temperature which are obtained in a case where the closing operation of the opening-and-closing member is performed after the reference load data is stored;

a pinch determination portion configured to determine an occurrence of pinch on the basis of a comparison result obtained by comparing a difference between the reference load data and the drive load data with a threshold set in order to determine the pinch at the opening-and-closing member, the pinch determination portion configured to correct a relative relation between the difference between the reference load data and the drive load data, and the threshold on the basis of a relative relation between a reference temperature which corresponds to the reference temperature data and a drive temperature which corresponds to the environmental temperature obtained at the closing operation of the opening-and-closing member after the reference load data is stored; and wherein a comparison processing at the pinch determination portion is invalidated in a case where a difference between the reference temperature and the drive temperature is not within a predetermined range.

2. The pinch detection apparatus according to claim 1, wherein the predetermined time corresponds to a time when a predetermined condition is established at the motor.

3. The pinch detection apparatus according to claim 1, wherein the pinch determination portion is configured to correct the threshold on the basis of the relative relation between the reference temperature and the drive temperature.

4. The pinch detection apparatus according to claim 2, wherein the pinch determination portion is configured to correct the threshold on the basis of the relative relation between the reference temperature and the drive temperature.

5. The pinch detection apparatus according to claim 3, wherein a correction amount at the correction of the threshold is defined as a positive function relative to a change from the reference temperature to the drive temperature.

6. The pinch detection apparatus according to claim 4, wherein a correction amount at the correction of the threshold is defined as a positive function relative to a change from the reference temperature to the drive temperature.

7. The pinch detection apparatus according to claim 1, wherein the pinch determination portion is configured to correct the drive load data on the basis of the relative relation between the reference temperature and the drive temperature.

8. The pinch detection apparatus according to claim 7, wherein a correction amount at the correction of the drive load data is defined as a negative function relative to a change from the reference temperature to the drive temperature.

9. The pinch detection apparatus according to claim 1, wherein the reference data storage portion is configured to update the reference load data at a predetermined timing.

10. The pinch detection apparatus according to claim 9, wherein in a case where the closing operation of the opening-and-closing member, which is performed after the reference load data is stored, ends without detecting the occurrence of the pinch and in a case where a predetermined condition is established at the closing operation, the drive load data which is obtained at the closing operation is rewritten as new reference load data.

11. An opening-and-closing member apparatus comprising:
an opening-and-closing member;
a motor;
a rotation speed detection portion detecting a rotation speed of the motor; and
a pinch detection apparatus actuated by the motor, the pinch detection apparatus comprising:
a reference data storage portion calculating load data on the basis of a rotation speed of the motor and an environmental temperature which are obtained in a case where a closing operation of the opening-and-closing member is performed at a predetermined time, the reference data storage portion storing the load data and the environmental temperature as reference load data and reference temperature data, respectively;
a drive load calculation portion calculating drive load data on the basis of the rotation speed of the motor and the environmental temperature which are obtained in a case where the closing operation of the opening-and-closing member is performed after the reference load data is stored;
a pinch determination portion configured to determine an occurrence of pinch on the basis of a comparison result obtained by comparing a difference between the reference load data and the drive load data with a threshold set in order to determine the pinch at the opening-and-closing member, the pinch determination portion configured to correct a relative relation between the difference between the reference load data and the drive load data, and the threshold on the basis of a relative relation between a reference temperature which corresponds to the reference temperature data and a drive temperature which corresponds to the environmental temperature obtained at the closing operation of the opening-and-closing member after the reference load data is stored; and
wherein a comparison processing at the pinch determination portion is invalidated in a case where a difference between the reference temperature and the drive temperature is not within a predetermined range.

12. A pinch detection apparatus for an opening-and-closing member actuated by a motor, the pinch detection apparatus comprising:
a reference data storage portion calculating load data on the basis of a rotation speed of the motor and an environmental temperature which are obtained in a case where a closing operation of the opening-and-closing member is performed at a predetermined time, the reference data storage portion storing the load data and the environmental temperature as reference load data and reference temperature data, respectively;
a drive load calculation portion calculating drive load data on the basis of the rotation speed of the motor and the environmental temperature which are obtained in a case where the closing operation of the opening-and-closing member is performed after the reference load data is stored; and
a pinch determination portion configured to determine an occurrence of pinch on the basis of a comparison result obtained by comparing a difference between the reference load data and the drive load data with a threshold set in order to determine the pinch at the opening-and-closing member, the pinch determination portion configured to correct a relative relation between the difference between the reference load data and the drive load data, and the threshold on the basis of a relative relation between a reference temperature which corresponds to the reference temperature data and a drive temperature which corresponds to the environmental temperature obtained at the closing operation of the opening-and-closing member after the reference load data is stored, and wherein the pinch determination portion is configured to correct the drive load data on the basis of the relative relation between the reference temperature and the drive temperature.

* * * * *